United States Patent [19]
Wood et al.

[11] Patent Number: 5,743,241
[45] Date of Patent: Apr. 28, 1998

[54] NITROUS OXIDE PLATE SYSTEM

[75] Inventors: John M. Wood; John T. Stewart, both of Wichita Falls, Tex.

[73] Assignee: Nitrous Express, Inc., Wichita Falls, Tex.

[21] Appl. No.: 892,192

[22] Filed: Jul. 14, 1997

[51] Int. Cl.[6] .................................................. F02M 25/10
[52] U.S. Cl. ........................... 123/531; 123/585; 123/590
[58] Field of Search ................................. 123/531, 585, 123/590, 593

[56] References Cited

U.S. PATENT DOCUMENTS

| | | | |
|---|---|---|---|
| 4,355,623 | 10/1982 | Graham | 123/590 |
| 4,628,890 | 12/1986 | Freeman | 123/590 |
| 4,672,940 | 6/1987 | Nakayama et al. | 123/590 |
| 4,674,466 | 6/1987 | Jung-Kwan | 123/590 |
| 5,287,828 | 2/1994 | Kennedy | 123/590 |
| 5,482,079 | 1/1996 | Bozzelli | 123/590 |

*Primary Examiner*—Erick R. Solis
*Attorney, Agent, or Firm*—Jerry C. Ray

[57] ABSTRACT

Apparatus for supplying a mixture of oxidizer and fuel to an internal-combustion engine includes a frame supporting oxidizer supply lines and fuel supply lines, the frame being mounted above an intake manifold and below the engine's carburetor. Discharge ports in the oxidizer and fuel supply lines are positioned so that a high-velocity flow of oxidizer entrains and atomizes a stream of fuel from an adjacent fuel-discharge port; each oxidizer port is aimed toward the mouth of a passage in the intake manifold so the stream of mixed oxidizer and fuel is directed into the passage without reducing the level of vacuum in the intake manifold plenum and so that the stream of oxidizer and fuel urges increased amounts of fuel-air mixture from the carburetor into the passage.

7 Claims, 4 Drawing Sheets

( VIEW 1-1 )

( VIEW 2-2 )

( VIEW 3-3 )

NITROUS OXIDE PLATE SYSTEM

CROSS REFERENCE TO RELATED APPLICATIONS

None.

BACKGROUND OF THE INVENTION

1. Field of the Invention

This invention relates to devices for introducing an oxidizer such as nitrous oxide into the intake manifold of an internal combustion engine, and specifically to such devices having perforated supply tubes for fuel and oxidizer.

2. Description of the Related Art

Introducing an oxidizer into an internal combustion engine to increase horsepower is well known. An oxidizer such as nitrous oxide ($N_2O$) may be injected into passages in an intake manifold which supply air and fuel to individual cylinders, or into the primary air-fuel flow into the manifold. The latter method typically involves an oxidizer supply having tubes extending across the passage joining the carburetor to the intake manifold. These oxidizer tubes spray oxidizer into the intake manifold plenum from a multiplicity of emitter port; some tube have contained as many as 88 ports.

A major problem with the system just described is that blowing an oxidizer and additional fuel into the plenum between carburetor and manifold alters and disrupts the "booster signal." Booster signal is used herein to mean the reduced pressure, expressed as a level of vacuum, in the carburetor throat and in the intake manifold plenum. As engine RPM increases, the pistons act as an air pump to pull increasing amounts of air into the engine; the partial vacuum in the fuel-air passage between the carburetor and the intake manifold becomes stronger with increasing RPM. Booster tubes are conduits which connect a fuel supply, typically the carburetor float bowl, with the air flow through the carburetor throat. Reduced pressure in the throat causes additional fuel to be drawn through the booster tubes from the float bowl and fed into the air flowing through the carburetor. The effect, of course, is to enrich the fuel-air mixture being fed into the intake manifold.

Blowing high-pressure oxidizer into the plenum below the carburetor raises the pressure there so the booster system cannot work as designed. The result is a leaning of the fuel-air mixture; the leaner mix can explode in the plenum of the intake manifold, damaging the engine. Even if there is no explosion, less fuel is fed into the intake manifold and the engine's available horsepower is reduced. Winning races depends on getting the maximum power possible from an engine, so anything which alters or disrupts the fuel supply is unacceptable.

SUMMARY OF THE INVENTION

The novelty in the present invention is the type and placement of emitter ports on the oxidizer supply tubes, and the consequent lack of disruption of the booster signal. Nitrous oxide emitter ports are each aimed at a mouth of a runner (passage) in the intake manifold, so the stream of oxidizer and fuel flows directly into the runner. This configuration avoids the oxidizer being dispensed haphazardly into the intake manifold plenum, which raises pressure in the plenum and decreases the quality of the vacuum. Lessening the vacuum, as explained above, reduces the amount of fuel supplied by the booster system.

Each fuel port is positioned so that fuel exiting the port will be entrained within and atomized by oxidizer flowing from an adjacent oxidizer port. Chamfering the mouth of each port allows the oxidizer stream to spread and more effectively mix with fuel and air in the intake manifold plenum.

Based on the above, an object of this invention is to provide an apparatus for supplying a mixture of fuel and oxidizer to an engine without affecting the booster signal of the engine.

A further object is to provide an oxidizer plate for an engine which will increase the horsepower of the engine while allowing additional fuel to be drawn from the engine's carburetor.

Another object is to provide an oxidizer system which blows a stream of oxidizer and fuel directly into the mouth of an intake manifold passage.

Further objects are to achieve the above with devices that are sturdy, compact, durable, lightweight, simple, safe, efficient, and reliable, yet easy to install, operate, and maintain.

The specific nature of the invention, as well as other objects, uses, and advantages thereof, will clearly appear from the following description and from the accompanying drawings, the different views of which are not necessarily scale drawings.

CATALOG OF THE ELEMENTS

Figure 1:
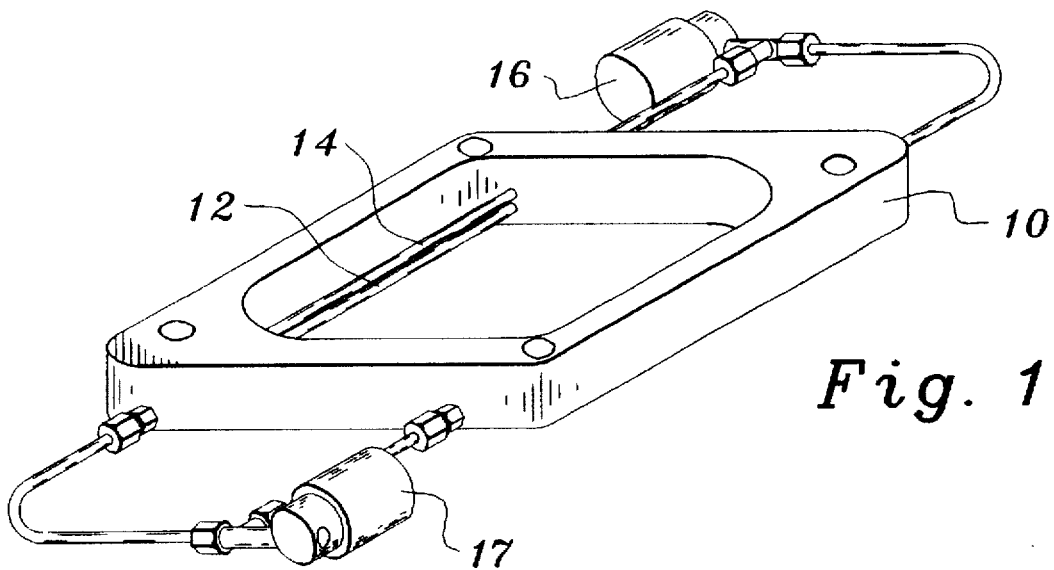
FIG. 1 is a front, side perspective of the plate assembly.

To aid in the correlation of the elements of the invention to the exemplary drawings, the following catalog of the elements is provided:

10 plate or frame
12 fuel supply tube
14 oxidizer supply tube
16 oxidizer valve
17 fuel valve
18 oxidizer port
20 fuel port

DESCRIPTION OF THE PREFERRED EMBODIMENTS

Referring to FIG. 1, a massive frame 10 supports supply lines for fuel and oxidizer. "Plate" is used in the industry to refer to the entire apparatus of FIG. 1 which is installed on an intake manifold, and is so used herein. The plate is installed on an internal combustion engine between the primary fuel-air supply (typically a carburetor) and the intake manifold. When the plate is installed, a large orifice or opening in the frame 10 is a continuation of the passage for the mixture of air and fuel vapor flowing from the carburetor into the intake manifold. The plate, made from aluminum, is approximately square in plan view, with outside dimensions of about 6.25". In one embodiment the orifice, also generally square, is 5.05" wide, resulting in a plate wall width of about 0.6". These dimensions are exemplary, as the dimensions of the plate vary with different engines. A thickness of the plate (top to bottom) is about 1.25". Corners of the plate are drilled to receive mounting bolts.

Figure 2:
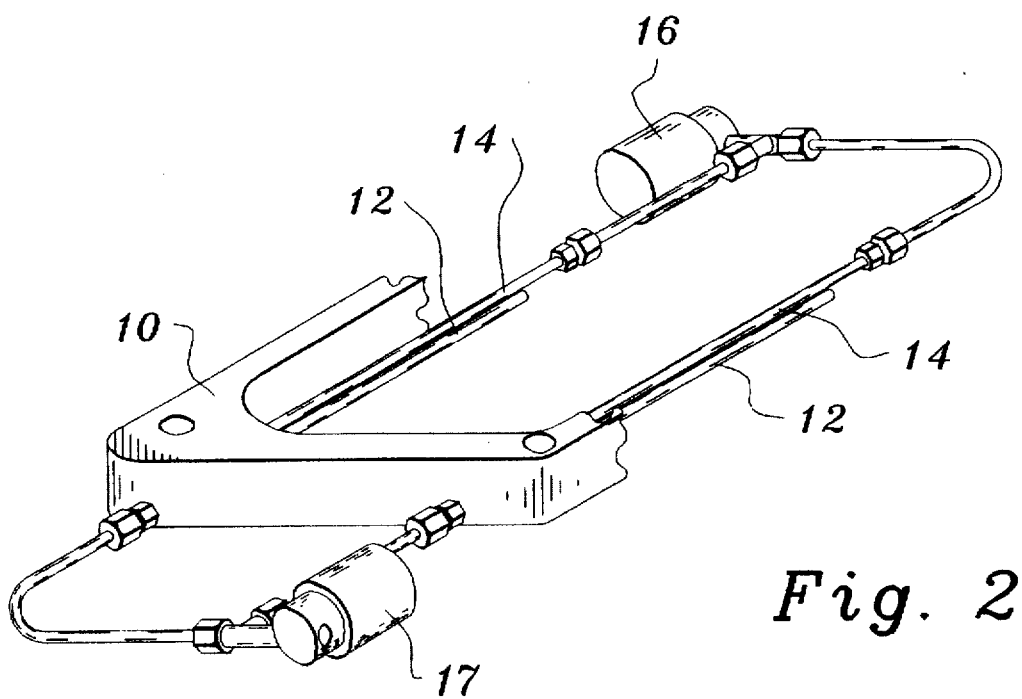
FIG. 2 is the perspective shown in FIG. 1 with the frame partially cut away.

Referring to FIG. 2, fuel supply tubes 12 and oxidizer supply tubes 14 introduce fuel and oxidizer into the fuel-air mixture flowing through the orifice in the plate. In FIGS. 1–4 and FIG. 8, the fuel-air mixture flows through the plate from top to bottom. Extending from either side of the plate, a supply tube passes completely through the frame wall on one side of the plate; the closed end of each tube extends into a recess in the opposite frame wall and is supported thereby.

Solenoid valves 16 and 17 control the flow of oxidizer and fuel, respectively, into the discharge portion of the tubes, i.e., that portion between the walls of the plate—see FIG. 2. Each solenoid valve is operated by a pair of electrical leads (not shown). The discharge portion of the supply tubes are commonly referred to in the industry as "fuel bars" or "rails."

Thus far, the apparatus as described is well known to manufacturers and users of high-performance automobiles and motorcycles.

As described in a previous section, the most widely used type of carburetor has "boosters" for supplying additional fuel to the air stream flowing through the carburetor. The booster includes a conduit from the carburetor float bowl, which is a fuel reservoir, to the carburetor throat. Increasing RPM on the engine increases the vacuum, i.e., lowers the pressure, in the carburetor throat; the stronger vacuum causes fuel to siphon through the booster conduit. Discharged into the air flow through the carburetor throat, fuel from the booster increases the amount of fuel supplied to the engine as it revs up to full power. Because the fuel bars discharge high-pressure oxidizer and fuel into the area beneath the carburetor throat, the effect is to lessen the vacuum in the carburetor throat, causing less fuel to be discharged from the booster supply. Thus the effectiveness of the booster system is reduced significantly.

As described below, placement of the emitter ports on the oxidizer and fuel supply tubes, and their relationship to each other is critical to the function of the present invention. Oxidizer, typically nitrous oxide ($N_2O$) is supplied under high pressure from a tank on the vehicle. Pressure for the $N_2O$ is in the range of 900–1,050 psi.

Figure 3:
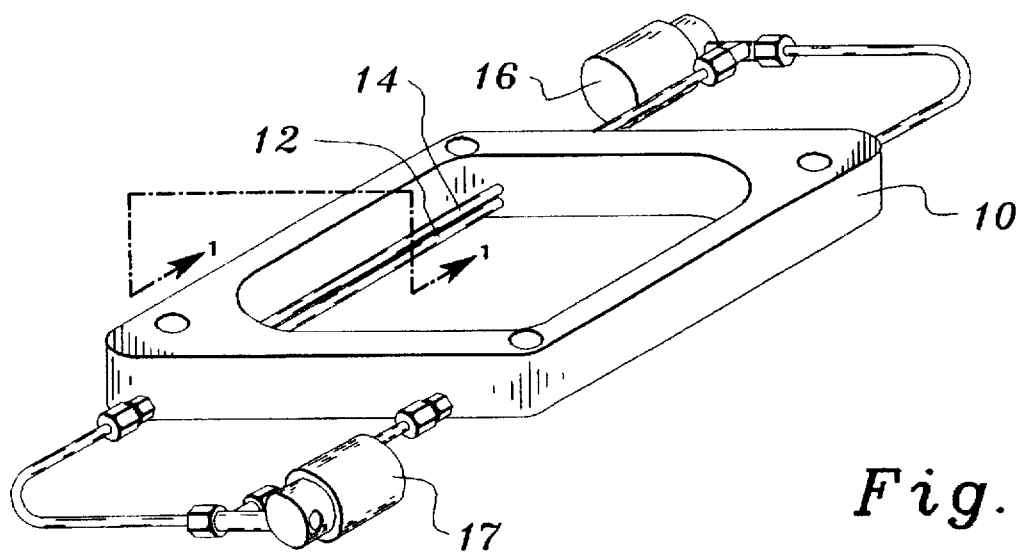
FIG. 3 is the perspective shown in FIG. 1 showing the location of view 1—1.
Figure 4:
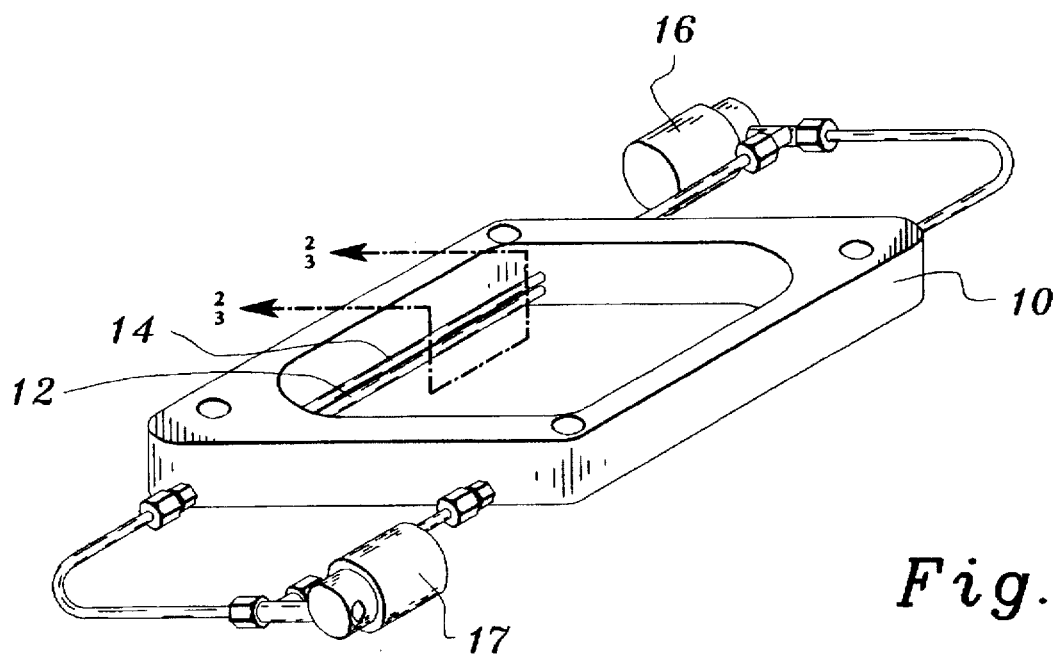
FIG. 4 is the perspective shown in FIG. 1 showing the location of views 2—2 and 3—3.
Figure 5:
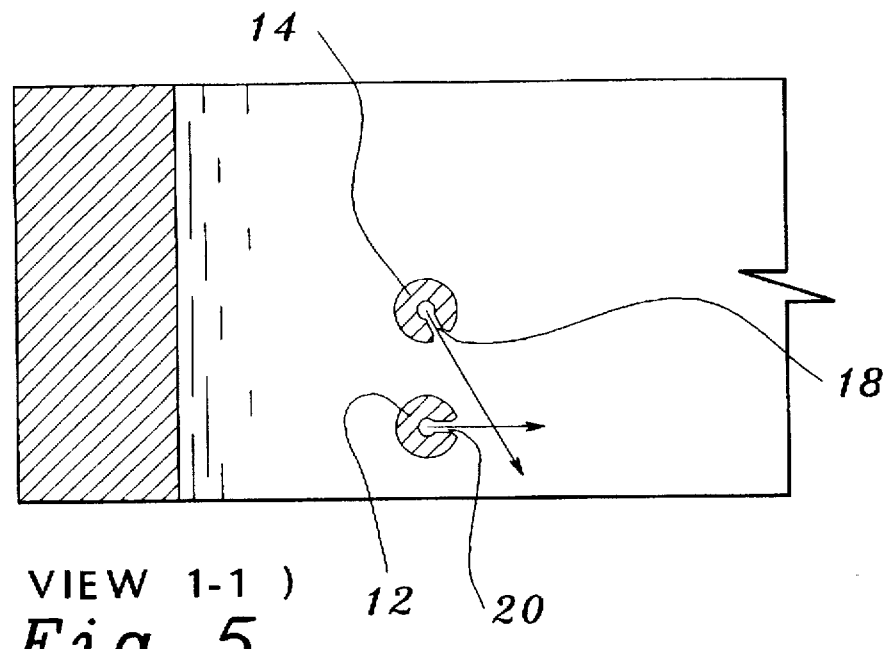
FIG. 5 is a cross section on view 1—1 of FIG. 3.
Figure 6:
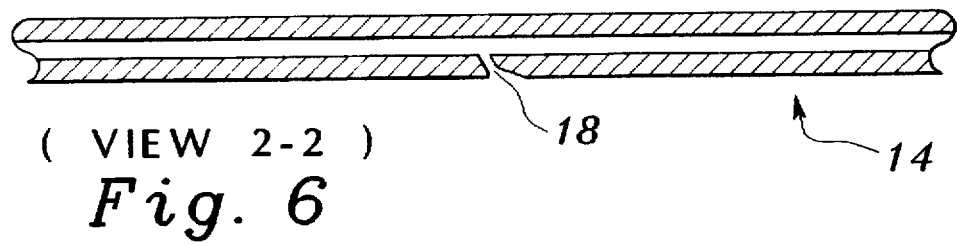
FIG. 6 is a cross section on view 2—2 of FIG. 4.
Figure 7:
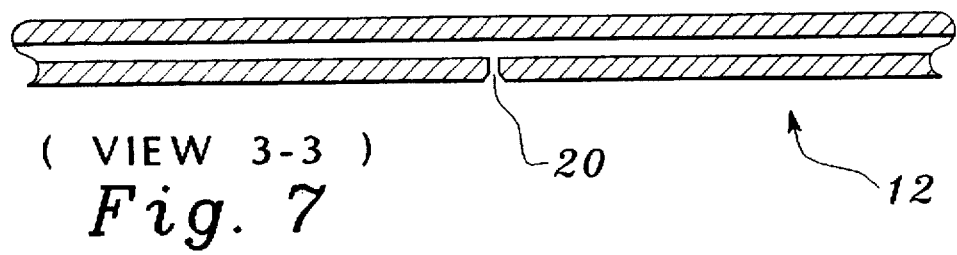
FIG. 7 is a cross section on view 3—3 of FIG. 4.
Figure 8:
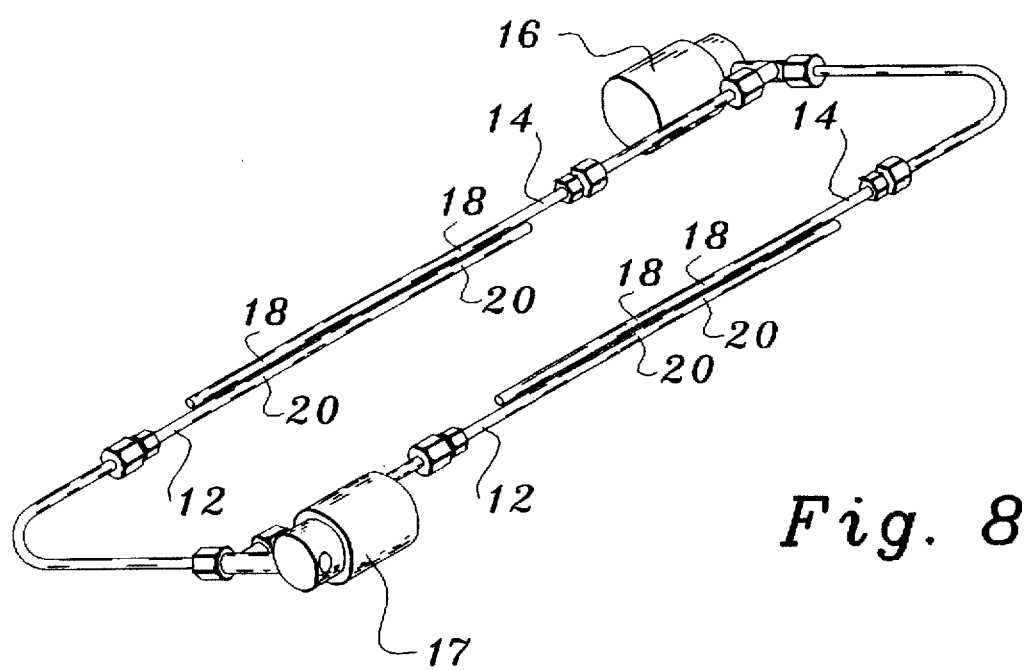
FIG. 8 is a front side perspective showing the oxidizer and fuel valves and tubes with the plate entirely cut away and showing the location of oxidizer and fuel ports.

Referring now to FIG. 5, a cross section along view 1—1 of FIG. 3 is shown. Similarly, FIGS. 6 and 7 are cross sections on view 2—2 and 3—3, respectively, of FIG. 4. The emitter ports for the oxidizer are placed and oriented so that the high-velocity flow of oxidizer from each port is directed towards the mouth of an intake passage or "runner" on the intake manifold. Fuel emitter ports are positioned so that a fuel stream from a port intersects an oxidizer stream from the adjacent oxidizer port. The arrows on FIG. 5 are to indicate the direction of oxidizer and fuel streams. Fuel spraying from a fuel port adjacent an oxidizer port is pulled into the oxidizer stream, where the fuel is immediately atomized.

Referring still to FIG. 5, the relationship of a fuel port 20 to an oxidizer port 18 is shown. The fuel port emits fuel generally horizontally, while the oxidizer port is oriented toward the mouth of a runner in the intake manifold. A detail of an oxidizer port 18 is shown in FIG. 6, and a detail of a fuel port 20 is shown in FIG. 7. For installation on an eight-cylinder engine, each of the two fuel bars or tubes 12 has four emitter ports 20, one for each runner on the intake manifold. Similarly, each of the oxidizer tubes 14 has four ports, each paired with an adjacent port on the nearby fuel bar.

As one example, many intake manifolds are in a "square" configuration, having two passage entries or mouths on each of four sides of the intake plenum. To accommodate this configuration the nitrous plate has two pairs of supply lines, one on either side of the orifice in the plate. Each supply tube has four emitter ports, with the ports nearest the center of the tube directed towards intake passages on one side of the manifold. Ports nearest each end of the tubes supply intake passages on the front and back walls (relative to the vehicle) of the manifold.

A typical diameter for an oxidizer port is 0.043", and for a fuel port is 0.031". These dimensions may vary, and would be larger for engines of greater horsepower. An outer end of each port is chamfered so the mouth of each port is wider than its throat. The flow through a port begins to expand while still in the chamfered section of the port, and the expansion continues as the stream exits the mouth of the port. Especially in the case of the high-pressure oxidizer, the stream broadens into wider flow on exiting the discharge port. Because the oxidizer stream is moving at a high velocity, a zone of reduced pressure is created around the flow; this reduced pressure causes the nearby fuel stream to be pulled into the oxidizer stream. The oxidizer flow entrains and atomizes the fuel, so that oxidizer and fuel are well mixed as they enter the mouth of a passage en route to a cylinder.

Flowing towards and into a runner mouth, each oxidizer-fuel stream increases the velocity of the air-fuel mixture moving into the runner mouth after having passed through the carburetor. Consequently, the overall flow of air through the carburetor increases when the oxidizer system is in operation, and the level of vacuum in the carburetor throat increases. Because the introduction of extra fuel from the booster outlets is responsive to the vacuum in the carburetor throat, additional fuel is drawn from the booster outlets, enriching the fuel-air mix. Engine performance is therefore enhanced not only by the introduction of an oxidizer, but also by the increased flow of fuel from the carburetor.

The restrictive description and drawing of the specific examples above do not point out what an infringement of this patent would be, but are to enable one skilled in the art to make and use the invention. Various modifications can be made in the construction, material, arrangement, and operation, and still be within the scope of our invention. The limits of the invention and the bounds of the patent protection are measured by and defined in the following claims.

We claim:

1. An apparatus to supply an oxidizer to an internal combustion engine, said engine having an intake manifold with passages to each cylinder of the engine, said apparatus including a plate having an orifice therein, at least one fuel supply tube, at least one oxidizer supply tube adjacent said fuel supply tube, said fuel supply tube and said oxidizer supply tube being supported by said plate, wherein the improvement comprises:

said oxidizer supply tube having at least one oxidizer discharge port, said fuel supply tube having at least one fuel discharge port adjacent said oxidizer discharge port, said oxidizer discharge port being positioned and aligned so that a stream of oxidizer from said oxidizer discharge port entrains and atomizes a stream of fuel from said fuel discharge port, and said oxidizer discharge port being positioned and aimed to direct a flow of oxidizer and atomized fuel toward a mouth of a passage of the intake manifold.

2. The invention as described in claim 1, wherein said oxidizer discharge port has a chamfered outer end to cause a flow therefrom to expand on exiting said oxidizer discharge port.

3. The invention as described in claim 1, further comprising:

a first pair of said discharge ports being positioned adjacent an end wall of said plate to blow into an opening in a passage mouth in an end of the intake manifold, and a second pair of discharge ports being positioned adjacent a side wall of said plate to blow into a passage mouth in a side of the intake manifold.

4. The invention as described in claim 1, further comprising:

said fuel discharge port being at an angle of about 90° to the vertical, and said oxidizer discharge port being at an angle of about 30° to the vertical.

5. The invention as described in claim 1, wherein an axis of said oxidizer discharge port is at an acute angle to a linear axis of said oxidizer supply tube.

6. The invention as described in claim 1, wherein an axis of said oxidizer discharge port is aligned with a mouth of a passage in the intake manifold.

7. An apparatus to supply an oxidizer to an internal combustion engine, said engine having an intake manifold with passages to each cylinder of the engine, said apparatus including a plate having an orifice therein, at least one fuel supply tube, at least one oxidizer supply tube adjacent said fuel supply tube, said fuel supply tube and said oxidizer supply tube being supported by said plate, wherein the improvement comprises:

said oxidizer supply tube having at least one oxidizer discharge port, said fuel supply tube having at least one fuel discharge port adjacent said oxidizer discharge port, said oxidizer discharge port being positioned and aligned so that a stream of oxidizer from said oxidizer discharge port entrains and atomizes a stream of fuel from said fuel discharge port, and said oxidizer discharge port being positioned and aimed to direct a flow of oxidizer and atomized fuel toward a mouth of a passage of the intake manifold, said flow of oxidizer and atomized fuel from said discharge ports urging an increased flow of an air and fuel mixture from a carburetor into a mouth of a passage of the intake manifold.

* * * * *